United States Patent
Subramanian et al.

(10) Patent No.: US 9,977,915 B2
(45) Date of Patent: May 22, 2018

(54) SYSTEM FOR CONTROLLING DATABASE SECURITY AND ACCESS

(71) Applicant: Bank of America Corporation, Charlotte, NC (US)

(72) Inventors: Senthil Ramachandran Subramanian, Singapore (SG); Satya V. Rao Iruku, Bordentown, NJ (US)

(73) Assignee: Bank of America Corporation, Charlotte, NC (US)

( * ) Notice: Subject to any disclaimer, the term of this patent is extended or adjusted under 35 U.S.C. 154(b) by 224 days.

(21) Appl. No.: 15/132,550

(22) Filed: Apr. 19, 2016

(65) Prior Publication Data

US 2017/0300704 A1 Oct. 19, 2017

(51) Int. Cl.
*G06F 21/62* (2013.01)
*G06F 21/44* (2013.01)

(52) U.S. Cl.
CPC .......... *G06F 21/6218* (2013.01); *G06F 21/44* (2013.01)

(58) Field of Classification Search
CPC .............................. G06F 21/6218; G06F 21/44
See application file for complete search history.

(56) References Cited

U.S. PATENT DOCUMENTS

| | | | | |
|---|---|---|---|---|
| 6,023,765 A * | 2/2000 | Kuhn | ................. | G06F 21/6218 713/166 |
| 6,085,191 A | 7/2000 | Fisher et al. | | |
| 7,051,039 B1 | 5/2006 | Murthy et al. | | |
| 8,327,419 B1 * | 12/2012 | Korablev | ............ | G06F 21/6218 707/728 |
| 8,635,707 B1 * | 1/2014 | Parenti | ................ | G06F 21/6218 713/182 |
| 9,087,209 B2 | 7/2015 | Mattsson et al. | | |
| 9,317,709 B2 * | 4/2016 | Procopio | ............ | G06F 21/6218 |
| 9,569,626 B1 * | 2/2017 | Brisebois | ................ | G06F 21/60 |
| 2001/0056550 A1 * | 12/2001 | Lee | ........................ | H04L 63/083 726/11 |
| 2002/0184521 A1 * | 12/2002 | Lucovsky | ........... | G06F 21/6218 726/6 |
| 2003/0088434 A1 * | 5/2003 | Blechman | .............. | G06Q 10/10 705/2 |
| 2004/0083395 A1 * | 4/2004 | Blechman | ........... | G06F 21/6227 726/28 |

(Continued)

Primary Examiner — Darren B Schwartz
(74) Attorney, Agent, or Firm — Banner & Witcoff, Ltd.; Michael A. Springs

(57) ABSTRACT

Systems for controlling access to a database are provided. A system may include a computing platform that may receive a request to access a database from a computing device. A unique identifier of the computing device may be compared to pre-registered device identifiers to determine whether the computing device is authorized to access the database. If not, the computing platform may prevent the computing device from accessing the database. If the computing device is authorized to access the database, the system may receive credentials from a user associated with the computing device. The system may determine whether the credentials of the user match credentials of a user authorized to access the database. If not, the system may prevent the user from accessing the database. If the user authorized to access the database, the system may determine one or more types of data the user is authorized to access.

21 Claims, 10 Drawing Sheets

(56) References Cited

U.S. PATENT DOCUMENTS

| | | | | |
|---|---|---|---|---|
| 2004/0186809 A1* | 9/2004 | Schlesinger | G06F 21/6218 | 705/50 |
| 2005/0177716 A1* | 8/2005 | Ginter | G06F 21/10 | 713/157 |
| 2005/0267847 A1* | 12/2005 | Blechman | G06F 21/6227 | 705/75 |
| 2006/0031094 A1* | 2/2006 | Cohen | A61M 5/1723 | 705/2 |
| 2006/0248599 A1* | 11/2006 | Sack | G06F 21/6227 | 726/27 |
| 2007/0156693 A1* | 7/2007 | Soin | G06F 21/604 | |
| 2008/0172366 A1* | 7/2008 | Hannel | H04L 63/0272 | |
| 2009/0234478 A1* | 9/2009 | Muto | H04L 67/1095 | 700/94 |
| 2010/0162389 A1* | 6/2010 | Burger | G06F 21/6218 | 726/21 |
| 2011/0191485 A1* | 8/2011 | Umbehocker | G06F 21/604 | 709/229 |
| 2012/0233670 A1* | 9/2012 | Bonnes | G06F 21/604 | 726/4 |
| 2013/0167196 A1* | 6/2013 | Spencer | H04W 8/22 | 726/3 |
| 2013/0208103 A1* | 8/2013 | Sands | G06F 21/31 | 348/78 |
| 2014/0173686 A1* | 6/2014 | Kgil | H04L 63/205 | 726/1 |
| 2014/0189808 A1* | 7/2014 | Mahaffey | H04L 63/083 | 726/4 |
| 2014/0237538 A1 | 8/2014 | Rodniansky | | |
| 2015/0135296 A1* | 5/2015 | Cason | H04L 63/0815 | 726/8 |
| 2015/0220659 A1 | 8/2015 | Rissanen | | |
| 2015/0278542 A1 | 10/2015 | Mattsson et al. | | |
| 2015/0319102 A1* | 11/2015 | Esdaile | H04L 47/803 | 709/225 |
| 2017/0104746 A1* | 4/2017 | Nair | H04L 63/083 | |

\* cited by examiner

| | | | | | |
|---|---|---|---|---|---|
| 402 | | EMPLOYEE DATA | | | 400 |
| USER | | | | | |

| EMPLOYEE | COMPENSATION | BENEFITS | RETIREMENT | HEALTH INSURANCE |
|---|---|---|---|---|
| NAME 1 | TTTT | LLLL | AAAA | XXXX |
| NAME 2 | TTTT | MMMM | AAAA | YYYY |
| NAME 3 | RRRR | NNNN | BBBB | ZZZZ |
| NAME 4 | | LLLL | AAAA | |
| NAME 5 | SSSS | NNNN | CCCC | ZZZZ |
| NAME 6 | TTTT | NNNN | AAAA | XXXX |
| NAME 7 | TTTT | NNNN | CCCC | YYYY |

404  406  408  410  412

516 — CANCEL    OK — 514

FIG. 4

SYSTEM FOR CONTROLLING DATABASE SECURITY AND ACCESS

BACKGROUND

Aspects of the disclosure relate to computer hardware and software. In particular, one or more aspects of the disclosure generally relate to computer hardware and software for controlling access to a secure database.

Organizations, such as corporate entities and other large enterprise organizations, often store sensitive or confidential information in one or more data stores. Because of the nature of this sensitive information, access to the database is often restricted. However, restricting users who may access the database may still make the systems vulnerable if the authorized users are accessing the database from a computing device without proper security measures. Accordingly, controlling the devices connecting to the dataset may also be a factor in providing and ensuring secure, controlled access to the database.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to computer systems that provide effective, efficient, and convenient ways of controlling access to a database. In some examples, a system may include a database access control computing platform that may be configured to receive a request to access a database from a computing device. A unique identifier of the computing device may be compared to pre-stored or pre-registered device identifiers to determine whether the computing device is authorized to access the database. If not, the computing platform may prevent the computing device from accessing the database.

If the computing device is authorized to access the database, the system may receive credentials from a user associated with the computing device. The system may then determine whether the credentials of the user match credentials of a user authorized to access the database. If not, the system may prevent the user (and/or the device) from accessing the database. If the user authorized to access the database, the system may determine one or more types of data the user is authorized to access.

Upon determining the types of data the user is authorized to access, the system may dynamically generate a user interface presenting the data the user is authorized to access and not displaying data which the user is not authorized to access.

Additional aspects described herein relate to auditing changes or modifications made to the database or data within the database, monitoring frequency of logins and automatically revoking privileges of users who have not logged in a predetermined amount of time or who are no longer employed by the entity. In addition, the system may detect a change in status of a user (e.g., job type, work group, role, or the like) and may modify access to the database or types of data within the database based on the change.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 4 illustrates one example dynamically generated user interface according to one or more aspects described herein;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed herein, large corporations, universities, government agencies, and the like, often store various types of sensitive, personal and/or confidential data in one or more databases. For example, these entities often store human resources information for the possibly thousands of employees of the entity. In some examples, human resources information may include name, address, contact information, unique identifier, compensation, compensation history, benefits information, health information, health insurance information, retirement information, and the like. In some examples, data for an employee's spouse, children, or other dependents may also be stored. Due to the sensitive nature of this (and other) types of data, it is important to restrict access to databases storing sensitive information.

Although access to such databases, and data stored therein, is often restricted to particular users who have a username, password, or other credentials to use to access the system, those authorized users may be accessing the system from computing devices that might not be secure (or as secure as desired or required by the entity). Accordingly, various arrangements described herein include pre-registering a unique identifier associated with a particular computing device. Accordingly, upon receiving a request to access the database from a computing device, the system may determine whether the device itself has been pre-registered. If not, access may be denied or prevented. If so, the system may then receive user credentials to determine whether the user associated with the device is authorized to access the database. Accordingly, this permits an additional level of security in that both the user and the computing device itself must be authorized to access the system before access may be permitted.

In addition, once access to the database is provided, the system may determine what data, types of data, or the like, the particular user is authorized to access. That is, a user may be restricted to viewing only a portion of the data within the database.

These and various other arrangements will be discussed more fully herein.

Figure 1:
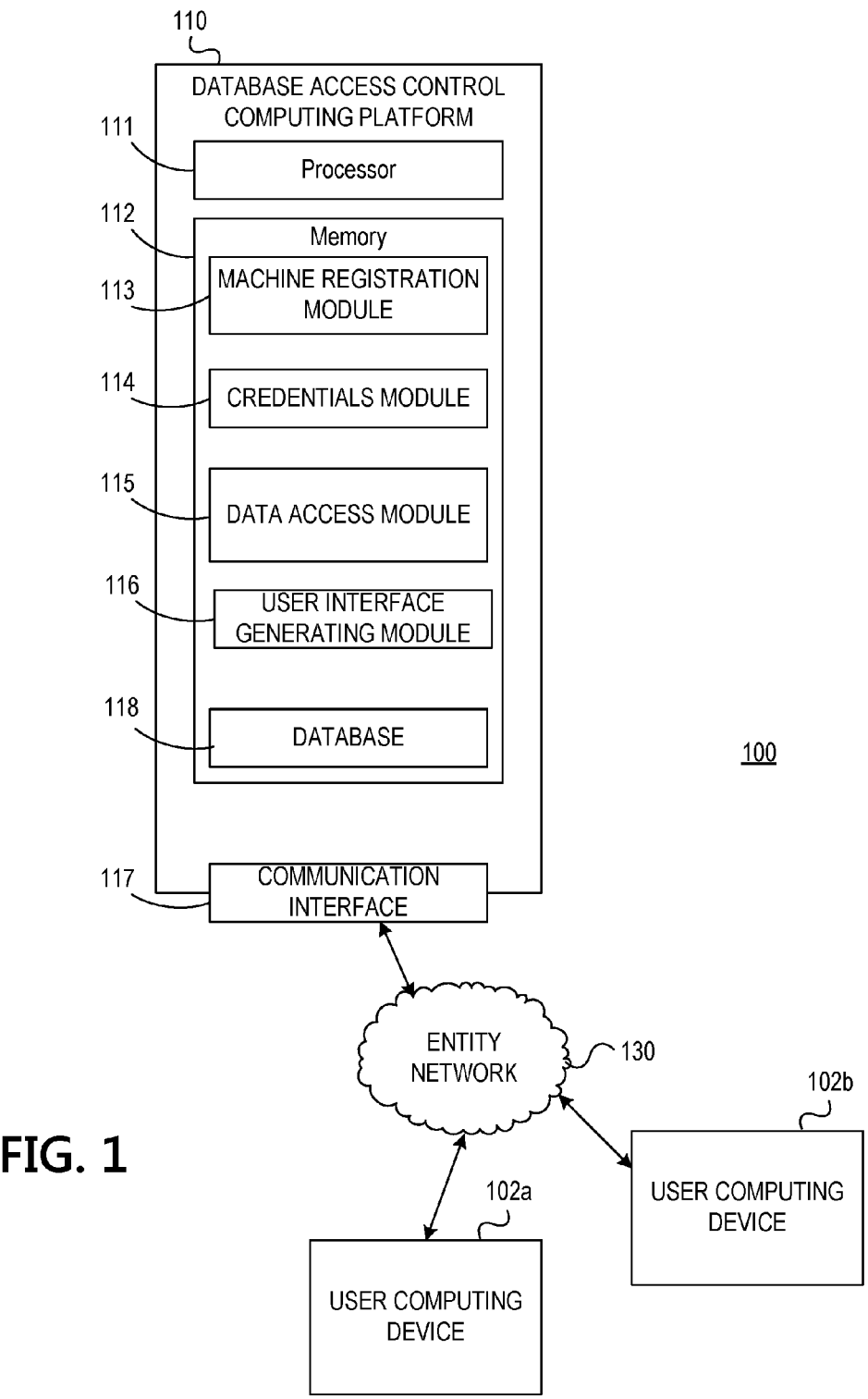
FIG. 1 depicts an illustrative database access control computing platform for controlling access to a database according to one or more aspects described herein.

FIG. 1 depicts an environment 100 including an illustrative computing platform for controlling database access, according to one or more aspects described herein. For instance, the environment 100 includes a database access control computing platform 110, which may include one or more processors 111, memory 112, and communication interface 119. A data bus may interconnect processor(s) 111, memory 112, and communication interface 119. Communication interface 119 may be a network interface configured to support communication between database access control computing platform 110 and one or more networks (e.g., network 130). One or more user computing devices 102a, 102b may be in communication with the database access control computing platform 110 (e.g., via network 130). Memory 112 may include one or more program modules having instructions that when executed by processor(s) 111 cause database access control computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of database access control computing platform 110 and/or by different computer systems that may form and/or otherwise make up the database access control computing platform 110. In some arrangements, different features or processes performed may be performed by different sets of instructions, such that the processor may execute each desired set of instructions to perform different functions described herein.

For example, memory 112 may include a machine registration module or device 113. The machine registration module 113 may include hardware and/or software configured to perform various functions within the database access control computing platform 110. For instance, the machine registration module 113 may store information related to machines (e.g., computing devices 102) that have been registered with the database access control computing platform 110. In some examples, only machines that have been registered (or pre-registered) to access the secure information associated with a database (such as database 118) may be permitted to access the database. Accordingly, in some examples, even if a user attempting to access the database is authorized to do so (e.g., has authorized credentials), if the user is not attempting to access the database 118 from a registered (or pre-registered machine) the user will not be permitted to access the database 118.

Accordingly, machine registration module 113 may permit machines (e.g., computing devices such as user computing device 102) to register with the database access control computing platform 110. A machine or device name and/or unique identifier (e.g., hard driver serial number, media access control address of a network card associated with the device, or the like) may be registered with the database access control computing platform 110 prior to a user attempting to access the database via the device. Registration may, in some examples, include additional information associated with a typical location of the device (e.g., as determined by GPS data), user information, owner information (e.g., company or entity) or the like. Registration may be performed via one or more user interfaces generated by, for example, the user interface generating module 116 which may be provided via an online system or application.

Registration information may be stored in the machine registration module 113 (or a database within the module 113) and, upon receiving, by the database access control computing platform 110, a request to access the database 118, the machine registration module 113 may receive machine identifying information from the user computer device attempting or requesting access and may determine whether the machine identifying information matches pre-stored information obtained during the registration process. If so, the machine may be permitted to access the database 118 (however, access to the data might not be permitted unless appropriate credentials of a user are provided). If not, the database access control computing platform 110 may transmit a notification and cause the notification to be displayed on the computing device attempting or requesting access indicating that access has been denied.

The database access control computing platform 110 may further include a credentials module or device 114. The credentials module 114 may include hardware and/or software configured to perform various functions within the database access control computing platform 110. For instance, the credentials module 114 may store credentials (e.g., user identifiers, passwords, or other identifying information) that have been provided to the system (e.g., in a database associated with the credentials module 114). In some examples, the credentials may be pre-stored during the machine registration process or other registration process.

Upon determining that the machine attempting to access the database 118 is authorized to do so (e.g., is registered with the database access control computing platform 110), the credentials module 114 may receive login information or credentials from a user attempting to access the database 118 via the registered machine. The credentials module 114 may determine whether the received credentials match pre-stored credentials and, if so, may provide access to the database 118 (including data stored therein or a portion of the data stored therein). If the credentials do not match, a notification may be generated and the database access control computing platform 110 may cause the notification to be displayed on a user computing device, such as device 102.

The database access control computing platform 110 may further include a data access module or device 115. The data access module or device 115 may include hardware and/or software configured to perform various functions within the database access control computing platform 110. For instance, the data access module 115 may receive, such as from the credentials module 114, an identity, role, or the like, of the user attempting to access the database 118 and may determine what portion of the data stored in the database to display to the user. For example, access to the data within the database may be restricted, such that certain users can only view a portion of the data stored in the database. In some examples, access to data may be based on an identity of the user, a job or role of the user, a business or work group of the user, or the like.

In some arrangements, a user may be permitted to view all data or types of data, except data associated with others in the user's work group. For example, upon logging in and accessing the database 118, the data access module 115 may receive or determine an identity of the user accessing the database 118. The data access module 115 may then determine a work group associated with the identified user. The work group may include other users who perform similar tasks or job functions as the user, work for the same supervisor, are in the same business unit, have the same job title, have a physical workspace within a predefined radius of a physical workspace of the user accessing the database, or the like. Data associated with or defining work groups, members of a work group, and the like, may be pre-stored in the data access module 115 or database associated therewith.

Upon identifying the work group of the user, the data access module 115 may then determine that the user may access a portion of data within the database 118 that does not include data associated with the other members of the work group. In some arrangements, the user may not access any data associated with other members of the work group. In other examples, the user may access only a portion of the data associated with other members of the work group.

The database access control computing platform 110 may further include a user interface generating module or device 116. The user interface generating module 116 may include hardware and/or software configured to perform various functions within the database access control computing platform 110. For instance, upon the data access module 115 determining the data to which the user has access, the user interface generating module 116 may dynamically generate a user interface displaying the data to which the user has access. The user interface generating module 116 may then transmit the dynamically generated user interface to the user device, such as user computing device 102, and may cause the user interface to be displayed on the user device 102.

In some examples, dynamically generating the user interface may include displaying all columns (and column headings) within the database 118, but without data associated with columns, rows, etc. related to data to which the data access module 115 has determined that the user does not have access. Accordingly, portions of the dynamically generated user interface may be blank due to the user not having access to particular portions of the data within the database 118.

As discussed herein, database 118 may store various types of data which is maintained securely. For instance, database 118 may store information such as human resources information which may include information associated with benefits, compensation, retirement funds, or the like, of one or more employees of an entity. The database may employ various data tables and data structures to store this information.

As indicated above, the database access control computing platform 110 may include one or more user computing devices 102a, 102b. The user computing devices 102a, 102b may be any type of computing device, including laptop computing devices, tablet computing devices, smart phones, desktop computing devices, and the like. The user computing devices 102a, 102b may be configured to connect to and/or communicate with database access control computing platform 110 in order to access database 118, as permitted. Although two user computing devices are shown in FIG. 1, more or fewer user computing devices may be used without departing from the invention.

Figure 2A:
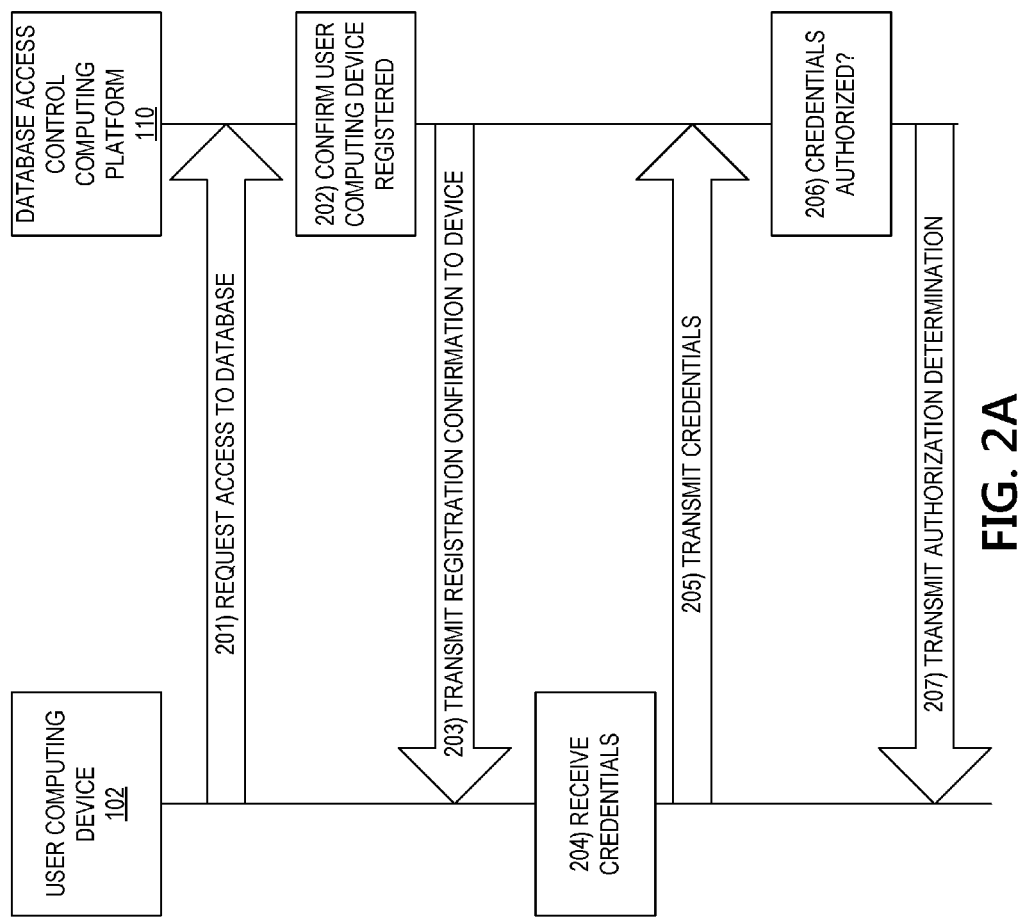
FIGS. 2A and 2B depict an illustrative event sequence for controlling access to a database according to one or more aspects described herein.
Figure 2B:
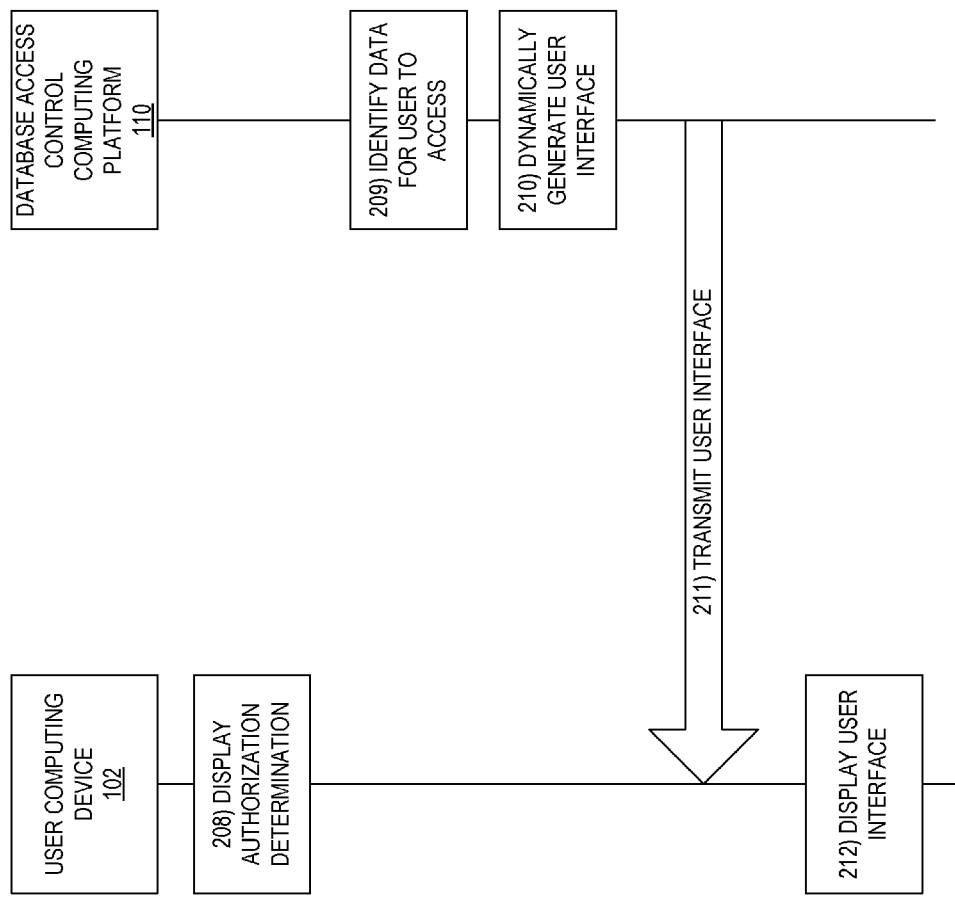

FIGS. 2A and 2B illustrate one example event sequence for providing secure database access via the database access control systems and arrangements described herein. The sequence illustrated in FIGS. 2A and 2B is merely one example sequence and various other events may be included, or events shown may be omitted, without departing from the invention.

In step 201, a request to access a database is received from a machine, such as user computing device 102. The request may be made from any of a plurality of users via the user computing device 102. Prior to determining whether a user attempting to access the system or database is authorized to do so, the system may determine, in step 202, whether the device attempting to access the database is authorized to do so. For instance, the database access control computing platform 110 may determine whether an identifier associated with the user computing device 102 matches pre-stored or preregistered user computing device information. If the user computing device 102 identifier does not match the pre-stored or preregistered information, the database access control computing platform may deny access to the database from the user computing device 102 (e.g., the database access control computing platform 110 may prevent the user computing device 102 from connecting to or otherwise accessing the database). A notification of the denial of requested access may be transmitted to the user computing device in step 203.

If, in step 202, the user computing device 102 identifier does match pre-stored or preregistered information, a notification of access may be provided to the user computing device in step 203. In step 204, credentials associated with a user attempting to access the database via the user computing device 102 may be received by the user computing device. The credentials may include a username or other unique identifier associated with the user attempting to access the database, as well as a password, personal identification number, biometric data, or other authorization information. In step 205, the credentials may be transmitted to the database access control computing platform 110.

In step 206, a determination may be made as to whether the received credentials match credentials associated with users authorized to access the database. For instance, the database access control computing platform 110 may determine whether the received credentials match pre-stored or preregistered credentials of a user who is authorized to access the database (or a portion thereof). If not, the database access control computing platform 110 may prevent the user from accessing the database via the user computing device 102 and may transmit a notification of the denial to the user computing device in step 207.

If the credentials do match credentials associated with a user authorized to access the database, a notification of the authorization may be transmitted to the user computing device 102 in step 207. In step 208, the authorization determination may be displayed on the user computing device (e.g., the database access control computing platform 110 may cause the notification to be displayed on the user computing device).

Upon determining that the user computing device and user are authorized to access the database, the database access control computing platform 110 may determine what data within the database may be accessed by the user in step 209. For instance, the database access control computing platform may receive or determine an identity of the user accessing the database, determine a role, work group, or other category of the user, and determine what data the user may access based on one or more of the user's identity, work group, and/or role. For instance, the database access control computing platform may determine that the identified user accessing the database is permitted to access all data within the database except data associated with other members of the user's work group. Accordingly, the system may identify the other members of the user's work group and may prevent access to data associated with those other members of the work group, while permitting access to the remaining data.

In step 210, the database access control computing platform may dynamically generate a user interface displaying the data to which the user has access. For instance, based on the determined data the user is authorized to access, the system may dynamically generate a user interface providing access (or making visible) only the portions of the data to which the user has access. Accordingly, in some examples, a portion of the columns of data in the database might not be provided to a user based on his or her access to the data. In another example, while all columns may be visible to the user in the dynamically generated user interface, some portions of the data might not be visible (e.g., there may be blank cells associated with some data elements). Accordingly, the database access control computing platform 110 may dynamically generate a user interface having the appropriate data for each user upon determining that both the user and the user computing device from which the user is accessing the database are authorized to access the database.

In step 211, the dynamically generated user interface may be transmitted to the user computing device and, in step 212, the database access control computing platform 110 may cause the interface to be displayed on the user computing device.

Figure 3:
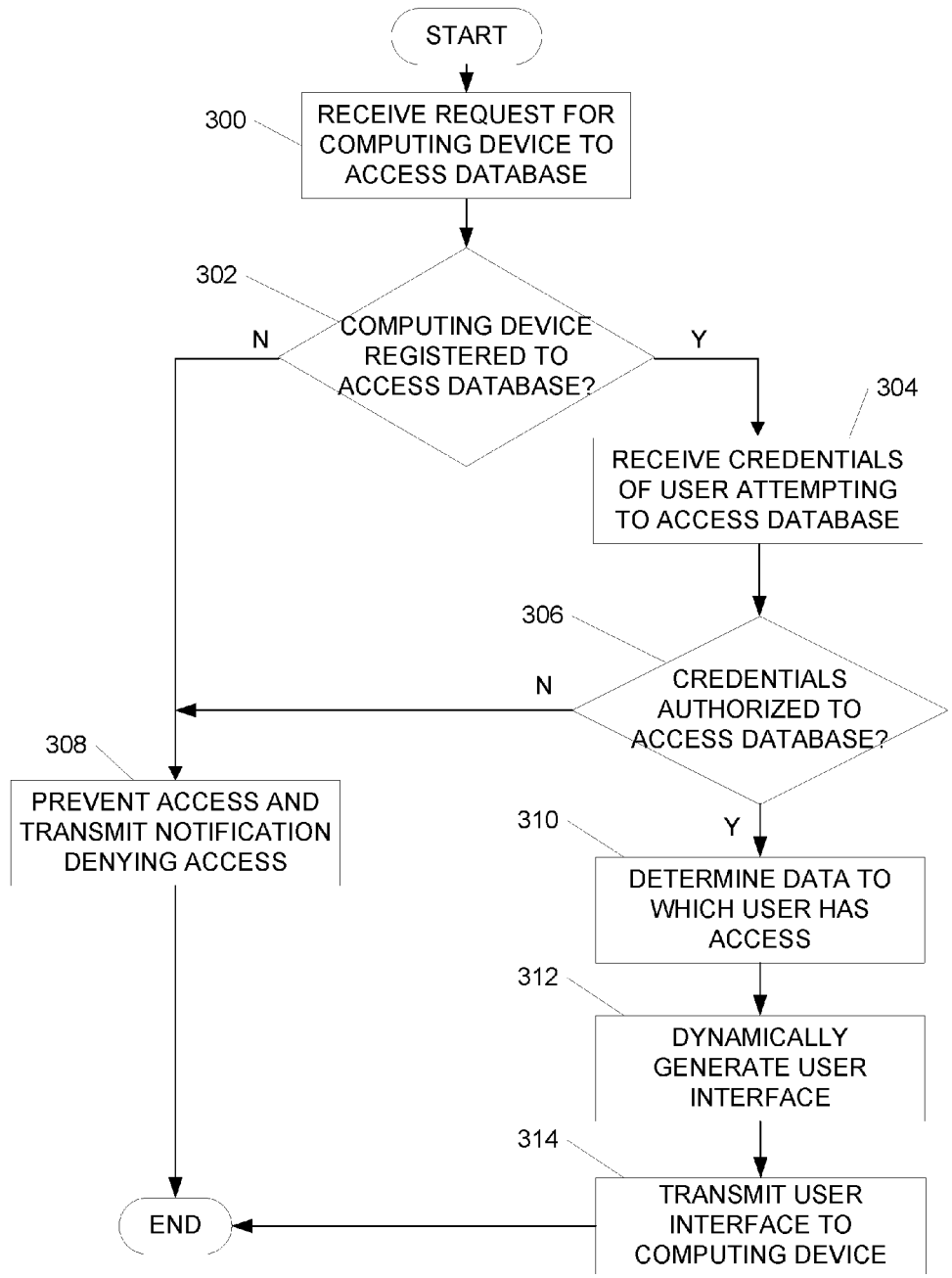
FIG. 3 illustrates one example method of providing secure access to a database according to one or more aspects described herein.

FIG. 3 illustrates one example method of providing secure access to a database according to one or more aspects described herein. In some examples, the database may contain sensitive, personal, or other information that is kept private or confidential and to which access may be restricted to individuals needing access to the information (e.g., in the course of normal business functions). In one example, the database may be a database of human resources information for a plurality of employees of an entity. The database may include information related to each employee's compensation, benefits, health information, bonus information, retirement information, and the like. Accordingly, the privacy and security of this information is important to the entity storing the information.

In step 300, a request to access the database from a user computing device may be received. In step 302, a determination is made as to whether the computing device attempting to access the database is authorized to do so. Such a determination may include receiving or retrieving a unique identifier associated with the user computing device and comparing it to a plurality of pre-stored or preregistered machine identifiers to determine whether the user computing device has been registered. If the user computing device is not registered, the device is not authorized to access the database and the system may prevent the user computing device from accessing the database in step 308. In addition, a notification may be transmitted to the user computing device indicating that access has been denied.

If, in step 302, the user computing device is authorized to access the database, in step 304 credentials of a user attempting to access the database via the user computing device may be received. In step 306, a determination is made as to whether the credentials are associated with a user authorized to access the database. For example, the credentials may be compared to a plurality of pre-stored or pre-registered credentials to determine whether the received credentials match credentials of a user authorized to access the database. If the credentials do not match, the system may prevent the user from accessing the database in step 308 and may transmit a notification indicating the denial of access to the user computing device.

If, in step 306, the credentials do match a user who is authorized to access the database, in step 310, the system may identify data within the database which the user may access. For instance, the user's access to data stored in the database may be limited or dictated by the user's identify, role within the entity, work group, or the like. For instance, an administrator of the database may access all information within the database. Alternatively, some users might only have access to a portion of the data (e.g., data associated with particular business groups, particular types of data (e.g., benefits data but not compensation data), or the like). Once the data to which the user has access has been determined, the system may dynamically generate a user interface in step 312. The user interface may, in some examples, include the information the user is authorized to access. For instance, the user interface may include only the information the user is authorized to access and other data might not be shown in the user interface.

In step 314, the user interface may be transmitted to the user computing device and the system may cause the user interface to be displayed on, for instance, a display of the user computing device. FIG. 4 illustrates one example dynamically generated user interface according to one or more aspects described herein.

For instance, FIG. 4 includes a user interface 400, displaying various types of data stored in a database. In the example shown, the user interface may be generated for a user authorized to access the database and accessing the database from a machine authorized to access the database. The interface 400 includes various columns including different types of data, such as compensation, benefits, retirement, and health insurance. More or fewer columns and/or types of data may be provided without departing from the invention.

For instance, interface 400 includes column 404 indicating names of employees, column 406 indicating compensation of each employee, column 408 indicating benefits of each employee, column 410 indicating retirement benefits of each employee, and column 412 indicating health insurance for each employee.

As shown, the user for whom the interface was dynamically generated is identified in field 402. As discussed herein, the user may not be authorized to access all information for all employees. For example, as shown in FIG. 4, the user does not have access to compensation or health insurance information for Name 4. Accordingly, those cells are blank. This information may be restricted from the user for various reasons, such as Name 4 is in the same work or business group as the user. In some examples, a user may not be authorized to view any information associated with other users within the user's work or business group.

Authorized users may make modifications to the database or data stored therein via the user interface 400. Accordingly, upon making any desired changes or modifications, the user may select "OK" option 514 to have the changes saved. Alternatively, to discard any modifications, the user may select "CANCEL" option 516.

FIG. 4 illustrates one example dynamically generated user interface. However, various other examples of types of data that may be displayed or restricted may be used without departing from the invention.

Figure 5:
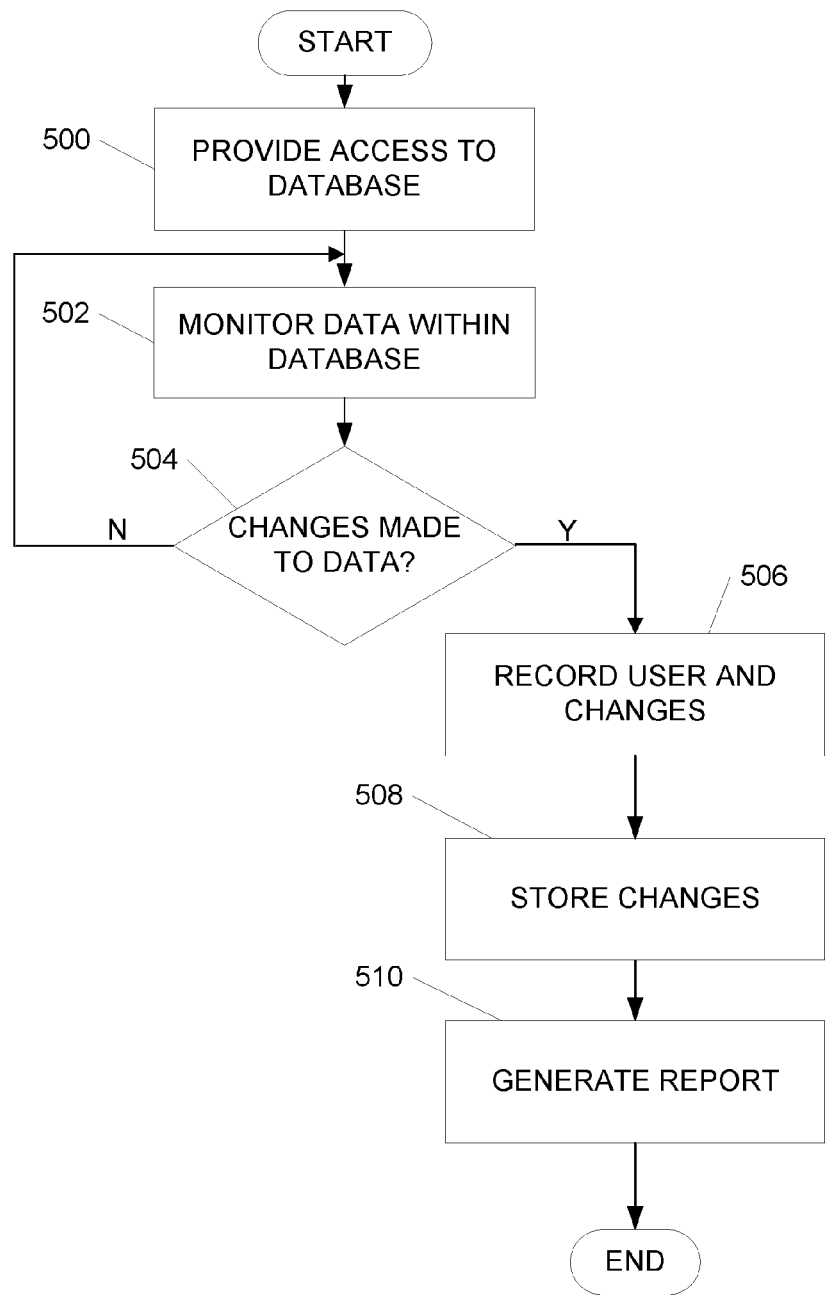
FIG. 5 illustrates one example method of tracking changes or other modifications made to a database or data within a database according to one or more aspects described herein.

FIG. 5 illustrates one example method of tracking changes or other modifications made to data within a database, according to one or more aspects described herein. In step 500, access to the database may be provided. For instance, step 500 may occur after it has been confirmed that both the user computing device and user are authorized to access the database, as described above.

In step 502, the system may monitor the database, data within the database and the like. For instance, the system may continuously monitor values of one or more data elements within the database, a status of the database, or the like, to identify any modifications to the database, data within the database, and the like. In step 504, a determination is made as to whether any modifications have been made. If not, the process may return to step 502 to continue monitoring the database.

If, in step 504, modifications are detected, in step 506, any changes made may be recorded. For instance, a type of data modified, a user associated with the modification, a previous value of a data element, a modified value of a data element, a time of the modification, date of the modification, machine from which the modification was made, and the like, may be recorded. In step 508, the recorded data may be stored until accessed or requested. In step 510, one or more reports may be generated providing information related to the modifications made based on the recorded and stored data.

Figure 6:
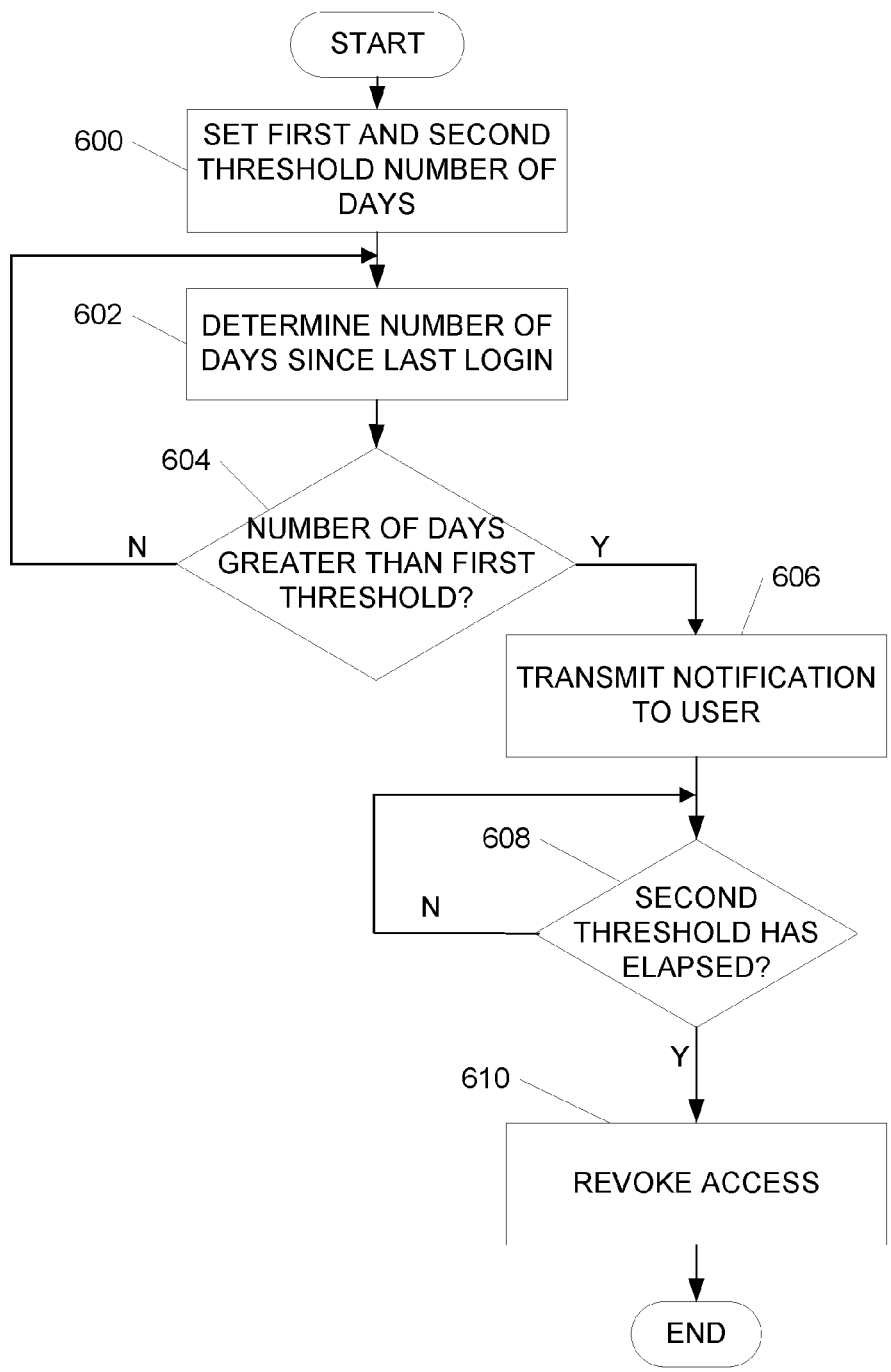
FIG. 6 illustrates one example method of revoking authorization to access a database according to one or more aspects described herein.

FIG. 6 illustrates one example method of revoking authorization to access a database according to one or more aspects described herein. In step 600, first and second threshold number of days may be determined. For instance, a system administrator or other authorized individual may determine a first threshold number of days which may trigger a first event. For instance, if a user has not logged in the database within the first threshold number of days, a notification may be transmitted to the user indicating that the user has not logged in recently and that if the user does not log in within the second threshold number of days, the user's access may be revoked. Alternatively, a single threshold may be used and, upon determining that a user has not logged in the first threshold number of days, the user's access may be automatically revoked.

In step 602, a number of days since a user's last login may be determined. This number may be determined by identifying a date of the last or most recent login and calculating a number of days between that date and the current date. In step 604, a determination is made as to whether this number is greater than or equal to the first threshold. If not, the system may return to step 602 to continue monitoring the user.

If, in step 604, the number of days is greater than or equal to the first threshold, a notification may be transmitted to the user in step 606. The notification may indicate that the user has not logged in recently and that if the user does not log in within the second threshold number of days, the user's access may be revoked.

In step 608, a determination may be made as to whether the second threshold number of days has elapsed without the user logging in to the system. If not, the system may return to step 508 to continue monitoring. If, in step 608, the second threshold number of days has elapsed without the user logging in, the system may automatically revoke the user's access in step 610.

Figure 7:
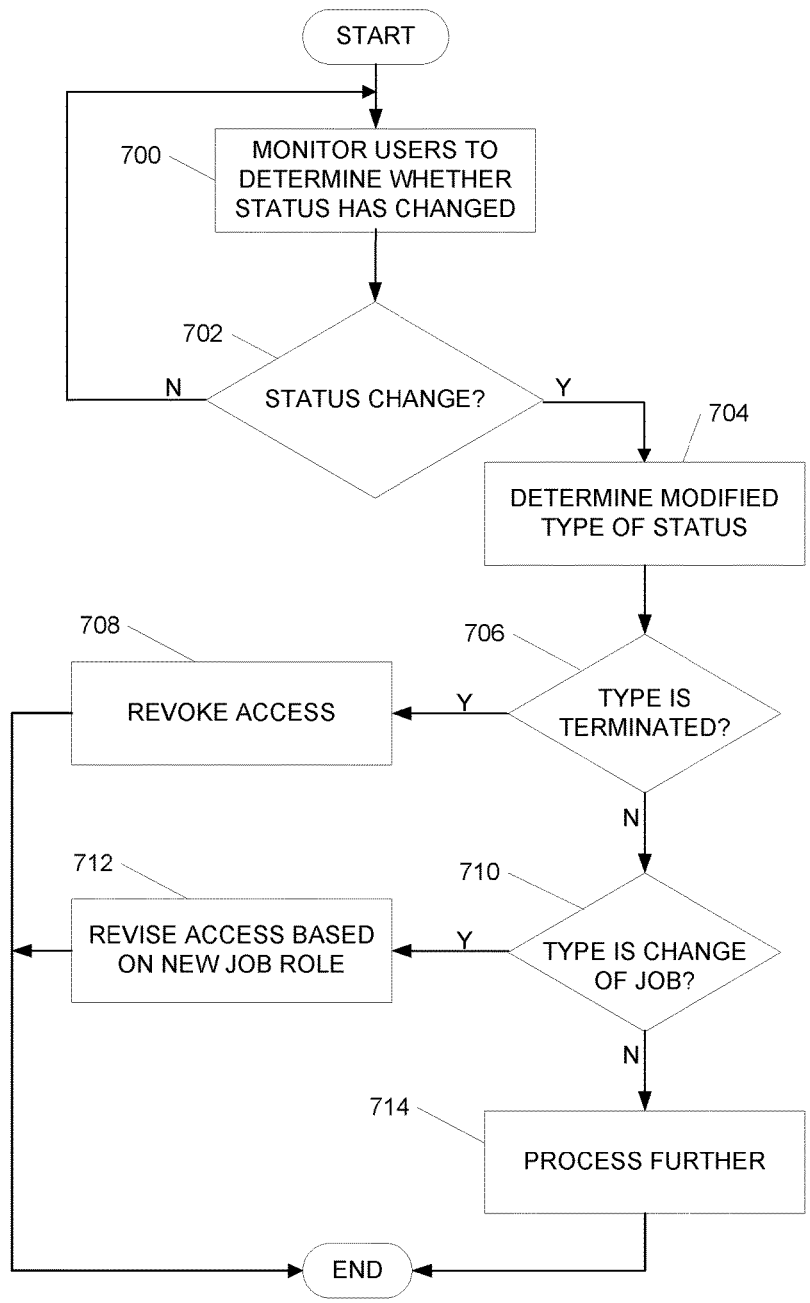
FIG. 7 illustrates one example method of modifying access for a user based on a change in status according to one or more aspects described herein.

FIG. 7 illustrates one example method of modifying access for a user based on a change in status according to one or more aspects described herein. In step 700, the system may monitor a status of users to determine whether the status has changed. In some examples, a status of the user may include whether the user is currently employed or terminated, a job role, a work group, or the like. The status may, in some examples, be stored with the credentials of the user and information related to data to which the user has access.

In step 702, a determination is made as to whether a status of a user has changed. If not, the process may return to step 600 to continue monitoring users. If, in step 702, a status of a user has changed (e.g., a modification of a data element indicating status has been detected) the new type of status may be determined in step 704. For instance, the user status may change from a type "currently employed" to type "terminated." In another example, the status may change from a type "role 1" to a type "administrator," wherein different roles and administrators have different access to data. In still another example, the status may change from a type "group 3" to type "group 7," wherein association with different work groups provides or prevents access to data of different users. Various other changes in type may be made without departing from the invention.

In step 706, a determination may be made as whether the modified type of status is "terminated." If yes, the system may automatically revoke the user's access to the database in step 708. If the modified type is not "terminated" in step 706, a determination may be made in step 710 as to whether the modified status is a change of job function or role. If so, the data which the user is authorized to access may be modified based on the revised status and/or new job role in step 712.

If, in step 710, the type is not a change of job, the change of status type may be flagged for further processing in step 714. For instance, in some examples, the item will be flagged for manual evaluation and modification of data access. In other examples, the system may analyze the status change, data that the user is authorized to access, and the like, to determine whether authorization to access the data or the portion of the data is still appropriate. Various other forms of additional processing may be performed without departing from the invention.

As discussed herein, various aspects of the database access control arrangements provide for permitting access to a database upon determining that both a machine or user computing device and user associated with the computing device are authorized to access the database. In some examples, The determination of whether the machine is authorized to access the database may be performed before the user credentials are evaluated. In other examples, the unique identifier of the machine and the credentials may be evaluated simultaneously.

Additionally or alternatively, if a particular computing device is authorized to access the database, the system may permit the device to connect to the database but may prevent any portion of the database from being displayed on the user computing device until it is determine that the user is authorized to access the database and what portion of the data, if any, the user is authorized to access.

In some arrangements, once it is determined that both the user and the computing device attempting to access the database are authorized to do so, the system may display the database (or structure of the database including columns, column headers, and the like) to the user. However, no data may populate the display until a determination is made as to what types of data the user is authorized to access.

In still other examples, as discussed herein, portions of the database (e.g., certain columns, rows associated with various users, or the like) might not be visible to a user who does not have access to that type of information. Alternatively, the user may be able to view column headers but no data elements may appear in the portions that the user is not authorized to view.

Figure 8:
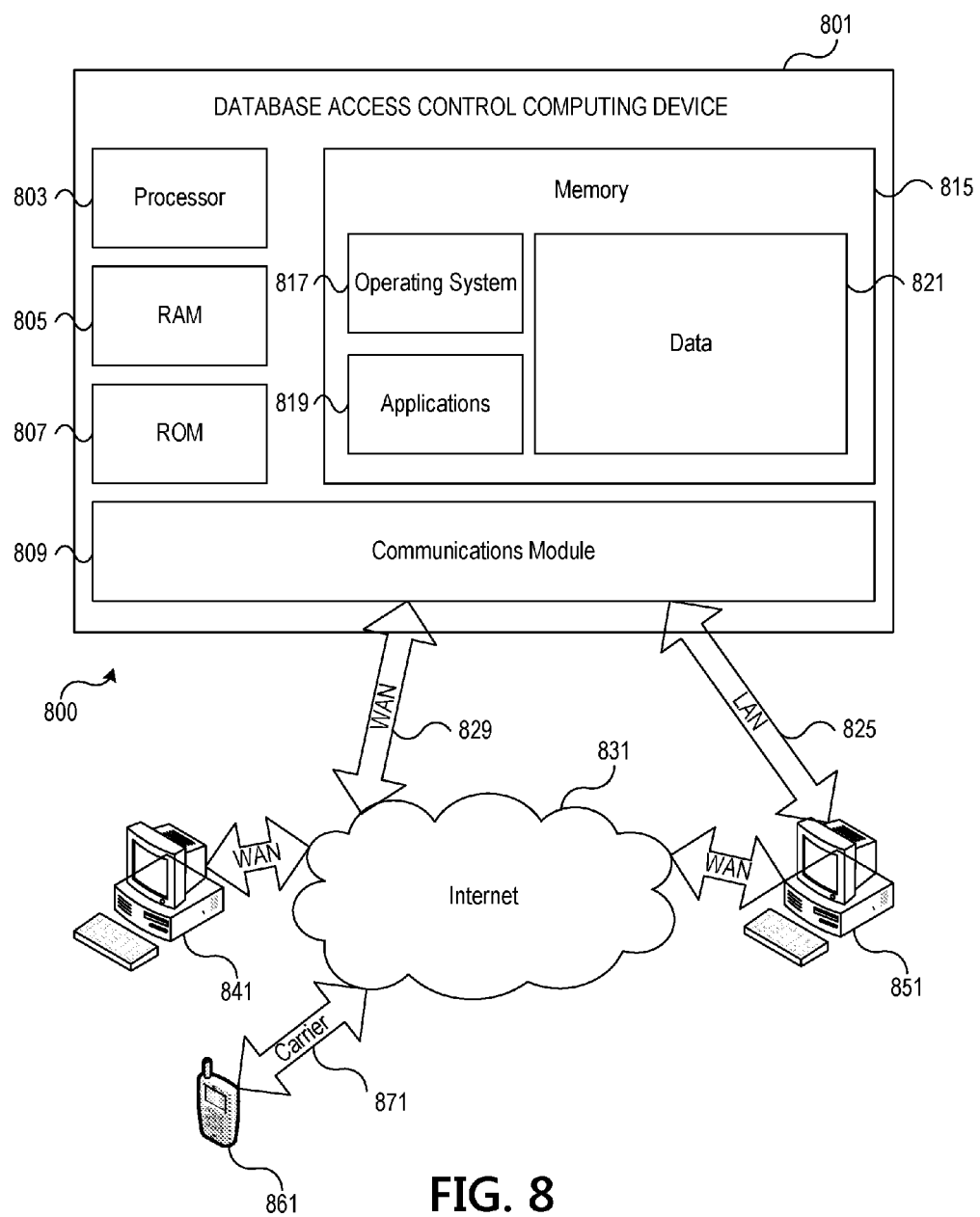
FIG. 8 illustrates one example operating environment in which various aspects of the disclosure may be implemented in accordance with one or more aspects described herein.

FIG. 8 depicts an illustrative operating environment in which various aspects of the present disclosure may be implemented in accordance with one or more example embodiments. Referring to FIG. 8, computing system environment 800 may be used according to one or more illustrative embodiments. Computing system environment 800 is only one example of a suitable computing environment and is not intended to suggest any limitation as to the scope of use or functionality contained in the disclosure. Computing system environment 800 should not be interpreted as having any dependency or requirement relating to any one or combination of components shown in illustrative computing system environment 800.

Computing system environment 800 may include database access control computing device 801 having processor 803 for controlling overall operation of database access control computing device 801 and its associated components, including random-access memory (RAM) 805, read-only memory (ROM) 807, communications module 809, and memory 815. Database access control computing device 801 may include a variety of computer readable media. Computer readable media may be any available media that may be accessed by database access control computing device 801, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 801.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on database access control computing device 801. Such a processor may execute computer-executable instructions stored on a computer-readable medium.

Software may be stored within memory 815 and/or storage to provide instructions to processor 803 for enabling database access control computing device 801 to perform various functions. For example, memory 815 may store software used by database access control computing device 801, such as operating system 817, application programs 819, and associated database 821. Also, some or all of the computer executable instructions for database access control computing device 801 may be embodied in hardware or firmware. Although not shown, RAM 805 may include one or more applications representing the application data stored in RAM 805 while database access control computing device 801 is on and corresponding software applications (e.g., software tasks) are running on database access control computing device 801.

Communications module 809 may include a microphone, keypad, touch screen, and/or stylus through which a user of database access control computing device 801 may provide input, and may also include one or more of a speaker for providing audio output and a video display device for providing textual, audiovisual and/or graphical output. Computing system environment 800 may also include optical scanners (not shown). Exemplary usages include scanning and converting paper documents, e.g., correspondence, receipts, and the like, to digital files.

Database access control computing device 801 may operate in a networked environment supporting connections to one or more remote computing devices, such as computing devices 841, 851, and 861. Computing devices 841, 851, and 861 may be personal computing devices or servers that include any or all of the elements described above relative to database access control computing device 801. Computing device 861 may be a mobile device (e.g., smart phone) communicating over wireless carrier channel 871.

The network connections depicted in FIG. 8 may include local area network (LAN) 825 and wide area network (WAN) 829, as well as other networks. When used in a LAN networking environment, database access control computing device 801 may be connected to LAN 825 through a network interface or adapter in communications module 809. When used in a WAN networking environment, database access control computing device 801 may include a modem in communications module 809 or other means for establishing communications over WAN 829, such as Internet 831 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like and are configured to perform the functions described herein.

Figure 9:
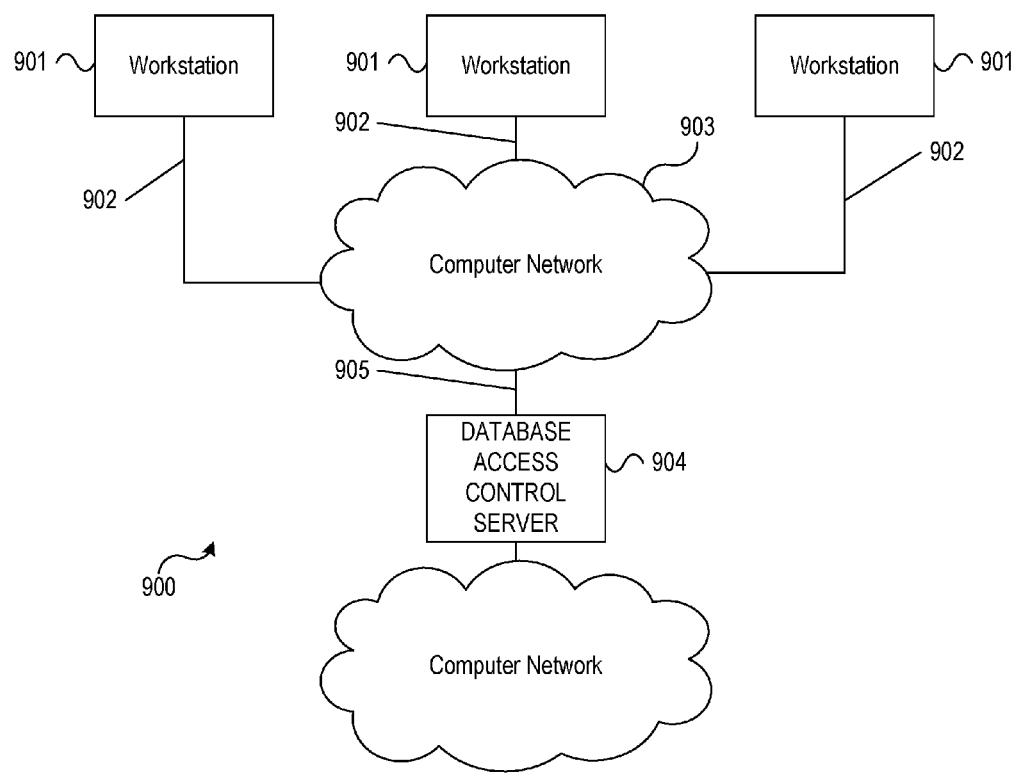
FIG. 9 depicts an illustrative block diagram of workstations and servers that may be used to implement the processes and functions of certain aspects of the present disclosure in accordance with one or more aspects described herein.

FIG. 9 depicts an illustrative block diagram of workstations and servers that may be used to implement the processes and functions of certain aspects of the present disclosure in accordance with one or more example embodiments. Referring to FIG. 9, illustrative system 900 may be used for implementing example embodiments according to the present disclosure. As illustrated, system 900 may include one or more workstation computers 901. Workstation 901 may be, for example, a desktop computer, a smartphone, a wireless device, a tablet computer, a laptop computer, and the like. Workstations 901 may be local or remote, and may be connected by one of communications links 902 to computer network 903 that is linked via communications link 905 to database access control server 904. In system 900, database access control server 904 may be any suitable server, processor, computer, or data processing device, or combination of the same. Server 904 may be used to process the instructions received from, and the transactions entered into by, one or more participants.

Computer network 903 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 902 and 905 may be any communications links suitable for communicating between workstations 901 and database access control server 904, such as network links, dial-up links, wireless links, hard-wired links, as well as network types developed in the future, and the like.

The system described herein may generally include aspects directed to controlling access to a secure database. These arrangements provide for an efficient and effective way to control access not only to users but to particular devices that are accessing the database. For instance, in some aspects, access to a database may be provided only if both the user computing device and user are determined to be authorized to access the database. Although various aspects described herein are directed to controlling access to a database, similar aspects may be used to control access to various other components or devices, as desired. Accordingly, the arrangements described herein aid in ensuring that authorized users and devices properly secured and equipped access sensitive information.

Further, additional aspects ensure that users who have a change in status are identified as quickly as possible to ensure that the user's authorization to access data is modified quickly. This may aid in ensuring that users who have been terminated or who no longer have a position in which access to the database is appropriate are quickly identified and their access to the database is quickly modified.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers or platforms and one or more networks. The functionality may be distributed in any manner, or may be located in a single computing device (e.g., a server, a client computer, and the like), or across multiple computing devices. In such arrangements, any and/or all of the above-discussed communications between modules of the computing platform may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A database access control computing platform, comprising:
    at least one processor;
    a communication interface communicatively coupled to the at least one processor; and
    a non-transitory memory storing computer-readable instructions that, when executed by the at least one processor, cause the database access control computing platform to:
    receive, from a user computing device, a request to connect to a database;
    determine whether the user computing device is authorized to access the database, the determining including retrieving a unique machine identifier of the user computing device and comparing the unique machine identifier of the user computing device to a plurality of pre-registered machine identifiers;

responsive to determining that the user computing device is authorized to access the database, receive credentials from a user associated with the user computing device;

determine whether the received credentials are associated with a user who is authorized to access the database;

responsive to determining that the credentials are associated with a user who is authorized to access the database, connecting the user computing device to the database;

identify, based on the received credentials, types of data to which the user associated with the user computing device has access; and dynamically generate a user interface for displaying portions of the database including the identified types of data on the user computing device.

2. The database access control computing platform of claim 1, wherein connecting the user computing device to the database includes providing the user computing device with access to the database but not to data stored within the database.

3. The database access control computing platform of claim 1, wherein connecting the user computing device to the database is performed only in response to determining that the user computing device is authorized to access the database and determining that the credentials are associated with a user who is authorized to access the database.

4. The database access control computing platform of claim 1, further including instructions that, when executed, cause the database access control computing platform to:
transmit the dynamically generated user interface to the user computing device and cause the user interface to be displayed on a display of the user computing device.

5. The database access control computing platform of claim 1, further including instructions that, when executed, cause the database access control computing platform to:
responsive to determining that the user computing device is not authorized to connect to the database, preventing the user computing device from connecting to the database;
generating a notification; and
causing the notification to be displayed on a display of the user computing device.

6. The database access control computing platform of claim 1, further including instructions that, when executed, cause the database access control computing platform to:
responsive to determining that the received credentials are not associated with a user authorized to access the database, generating a notification and causing the notification to be displayed on a display of the user computing device.

7. The database access control computing platform of claim 1, further including instructions that, when executed, cause the database access control computing platform to:
identify a work group of the user associated with the user computing device; and
identify a plurality of other users within the work group, wherein identifying the types of data to which the user associated with the user computing device has access includes identifying types of data not associated with the identified plurality of other users within the work group, and
wherein dynamically generating the user interface displaying portions of the database on the user computing device includes not displaying data associated with the plurality of other users in the work group.

8. A method, comprising:
receiving, from a user computing device, a request to connect to a database;
determining, by a database access control server, whether the user computing device is authorized to access the database, the determining including retrieving a unique machine identifier of the user computing device and comparing the unique machine identifier to a plurality of pre-registered machine identifiers;
responsive to determining that the user computing device is authorized to access the database, receiving, by the database access control server, credentials from a user associated with the user computing device;
determining, by the database access control server, whether the received credentials are associated with a user who is authorized to access the database;
responsive to determining that the credentials are associated with a user who is authorized to access the database, connecting the user computing device to the database;
identifying, by the database access control server and based on the received credentials, types of data to which the user associated with the user computing device has access; and
dynamically generating, by the database access control server, a user interface for displaying portions of the database including the identified types of data on the user computing device.

9. The method of claim 8, wherein connecting the user computing device to the database includes providing the user computing device with access to the database but not to data stored within the database.

10. The method of claim 8, wherein connecting the user computing device to the database is performed only in response to determining that the user computing device is authorized to access the database and determining that the credentials are associated with a user who is authorized to access the database.

11. The method of claim 8, further including:
transmitting, by the database access control server, the dynamically generated user interface to the user computing device and causing, by the database access control server, the user interface to be displayed on a display of the user computing device.

12. The method of claim 8, further including:
responsive to determining that the user computing device is not authorized to connect to the database, preventing, by the database access control server, the user computing device from connecting to the database;
generating, by the database access control server, a notification; and
causing, by the database access control server, the notification to be displayed on a display of the user computing device.

13. The method of claim 8, further including:
responsive to determining that the received credentials are not associated with a user authorized to access the database, generating, by the database access control server, a notification and causing, by the database access control server, the notification to be displayed on a display of the user computing device.

14. The method of claim 8, further including:
identifying, by the database access control server, a work group of the user associated with the user computing device; and
identifying, by the database access control server, a plurality of other users within the work group, wherein identifying the types of data to which the user associated with the user computing device has access includes identifying types of data not associated with the identified plurality of other users within the work group, and wherein dynamically generating the user interface for displaying portions of the database on the user computing device includes not displaying data associated with the plurality of other users in the work group.

15. One or more non-transitory computer-readable media storing instructions that, when executed by a computer system comprising at least one processor, memory, and a communication interface, cause the computer system to:

receive, from a user computing device, a request to connect to a database;

determine whether the user computing device is authorized to access the database, the determining including retrieving a unique machine identifier of the user computing device and comparing the unique machine identifier to a plurality of pre-registered machine identifiers;

responsive to determining that the user computing device is authorized to access the database, receive credentials from a user associated with the user computing device;

determine whether the received credentials are associated with a user who is authorized to access the database;

responsive to determining that the credentials are associated with a user who is authorized to access the database, connecting the user computing device to the database;

identify, based on the received credentials, types of data to which the user associated with the user computing device has access; and dynamically generate a user interface for displaying portions of the database including the identified types of data on the user computing device.

16. The one or more non-transitory computer-readable media of claim 15, wherein connecting the user computing device to the database includes providing the user computing device with access to the database but not to data stored within the database.

17. The one or more non-transitory computer-readable media of claim 15, wherein connecting the user computing device to the database is performed only in response to determining that the user computing device is authorized to access the database and determining that the credentials are associated with a user who is authorized to access the database.

18. The one or more non-transitory computer-readable media of claim 15, further including instructions that, when executed, cause the computer system to:

transmit the dynamically generated user interface to the user computing device and cause the user interface to be displayed on a display of the user computing device.

19. The one or more non-transitory computer-readable media of claim 15, further including instructions that, when executed, cause the computing system to:

responsive to determining that the user computing device is not authorized to connect to the database, preventing the user computing device from connecting to the database;

generating a notification; and causing the notification to be displayed on a display of the user computing device.

20. The one or more non-transitory computer-readable media of claim 15, further including instructions that, when executed, cause the computing system to:

responsive to determining that the received credentials are not associated with a user authorized to access the database, generating a notification and causing the notification to be displayed on a display of the user computing device.

21. The one or more non-transitory computer-readable media of claim 15, further including instructions that, when executed, cause the computing system to:

identify a work group of the user associated with the user computing device; and identify a plurality of other users within the work group, wherein identifying the types of data to which the user associated with the user computing device has access includes identifying types of data not associated with the identified plurality of other users within the work group, and wherein dynamically generating the user interface for displaying portions of the database on the user computing device includes not displaying data associated with the plurality of other users in the work group.

* * * * *